May 12, 1942. H. A. FINE 2,283,137
METHOD OF AND APPARATUS FOR MAKING ABSORBENT PADS
Filed Oct. 15, 1938 4 Sheets-Sheet 1
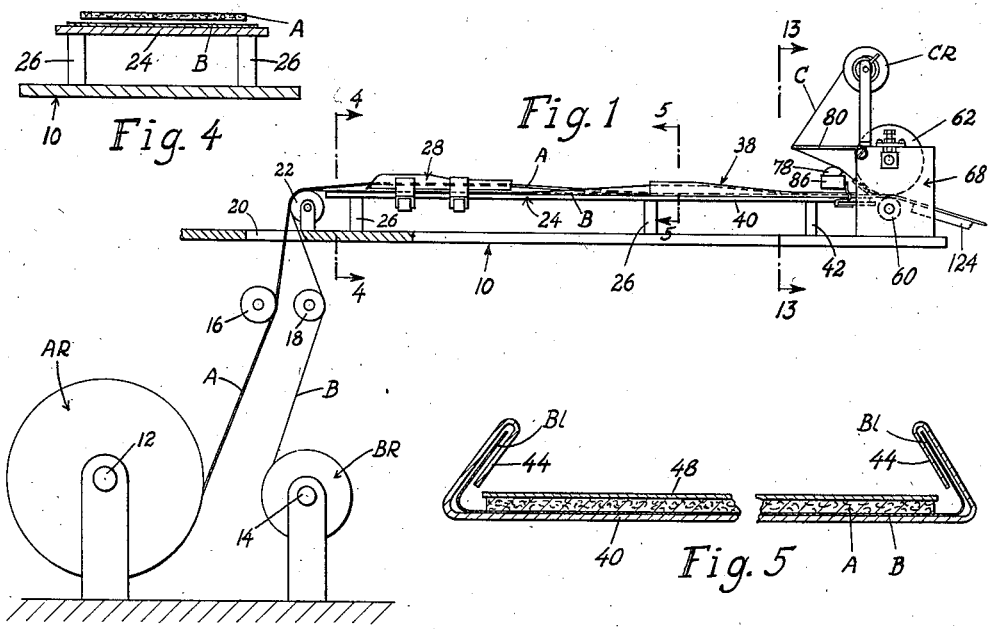
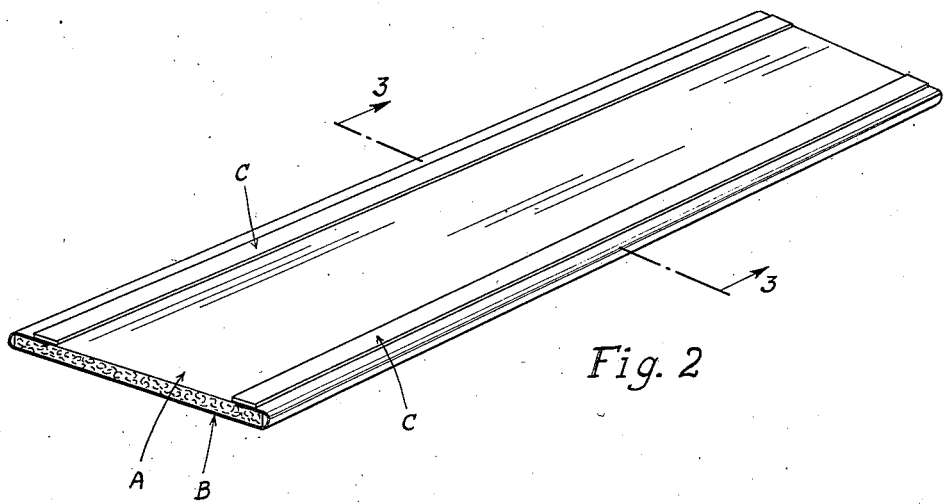
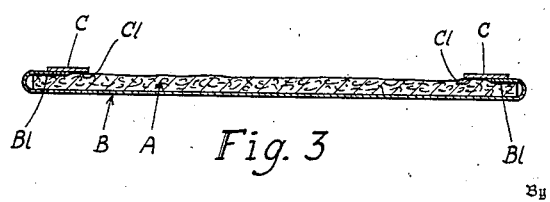
Inventor
HARRY A. FINE
Attorney May 12, 1942.  H. A. FINE  2,283,137
METHOD OF AND APPARATUS FOR MAKING ABSORBENT PADS
Filed Oct. 15, 1938   4 Sheets-Sheet 2
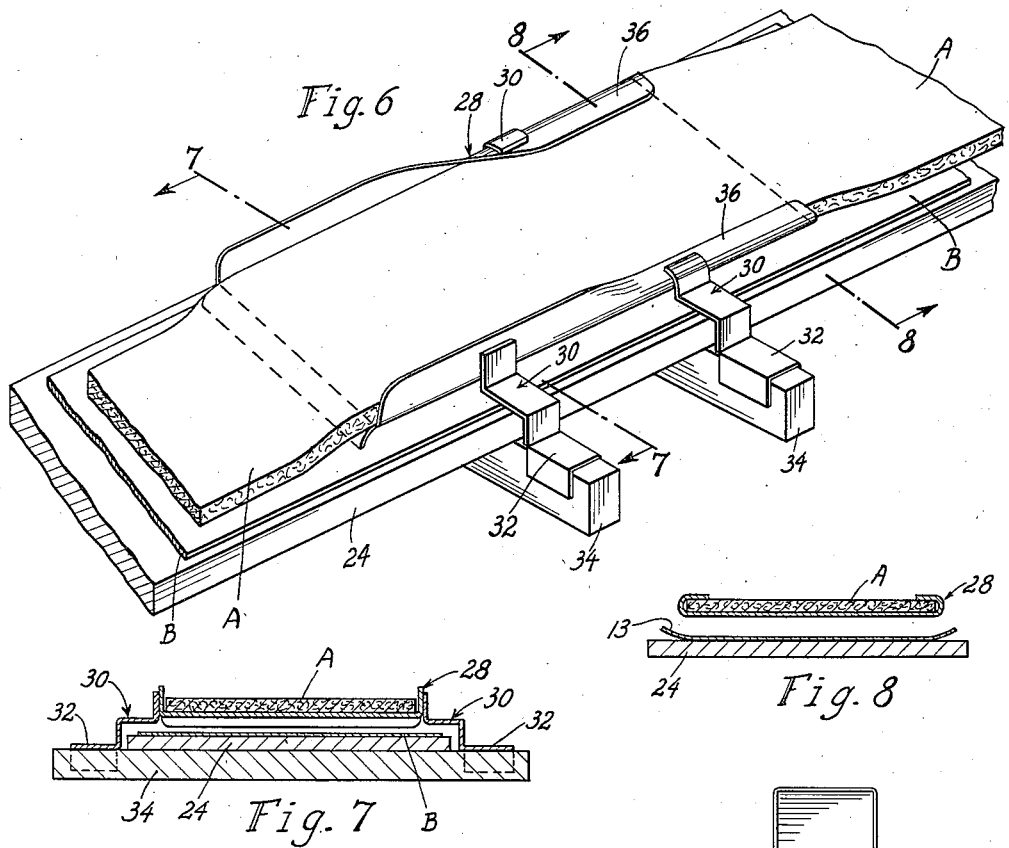
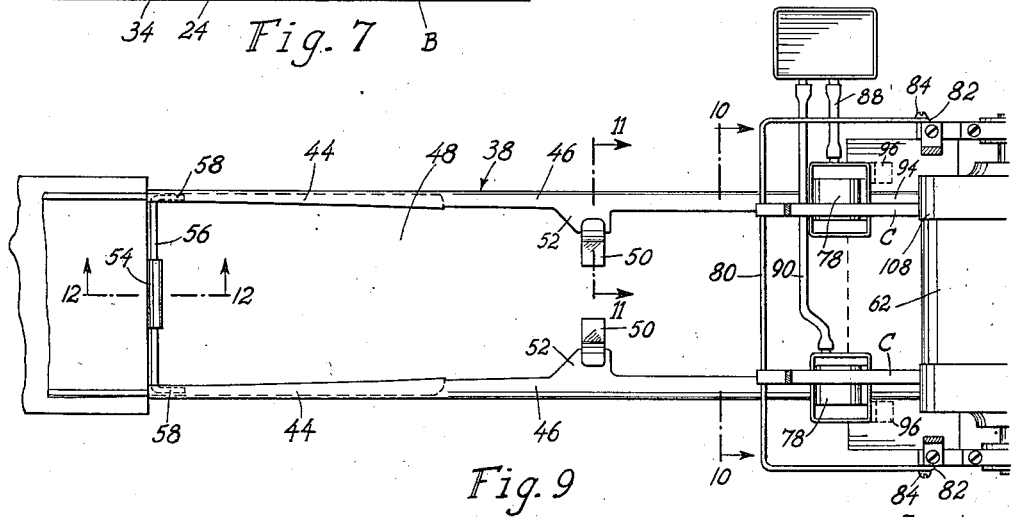
Inventor
HARRY A. FINE
By Edwin Leishler
Attorney May 12, 1942. H. A. FINE 2,283,137
METHOD OF AND APPARATUS FOR MAKING ABSORBENT PADS
Filed Oct. 15, 1938 4 Sheets-Sheet 3
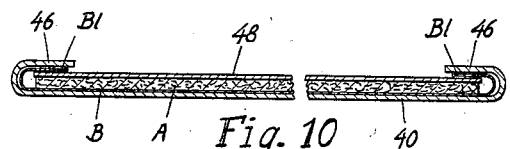
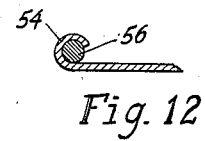
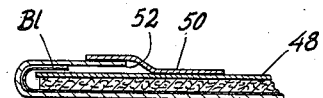
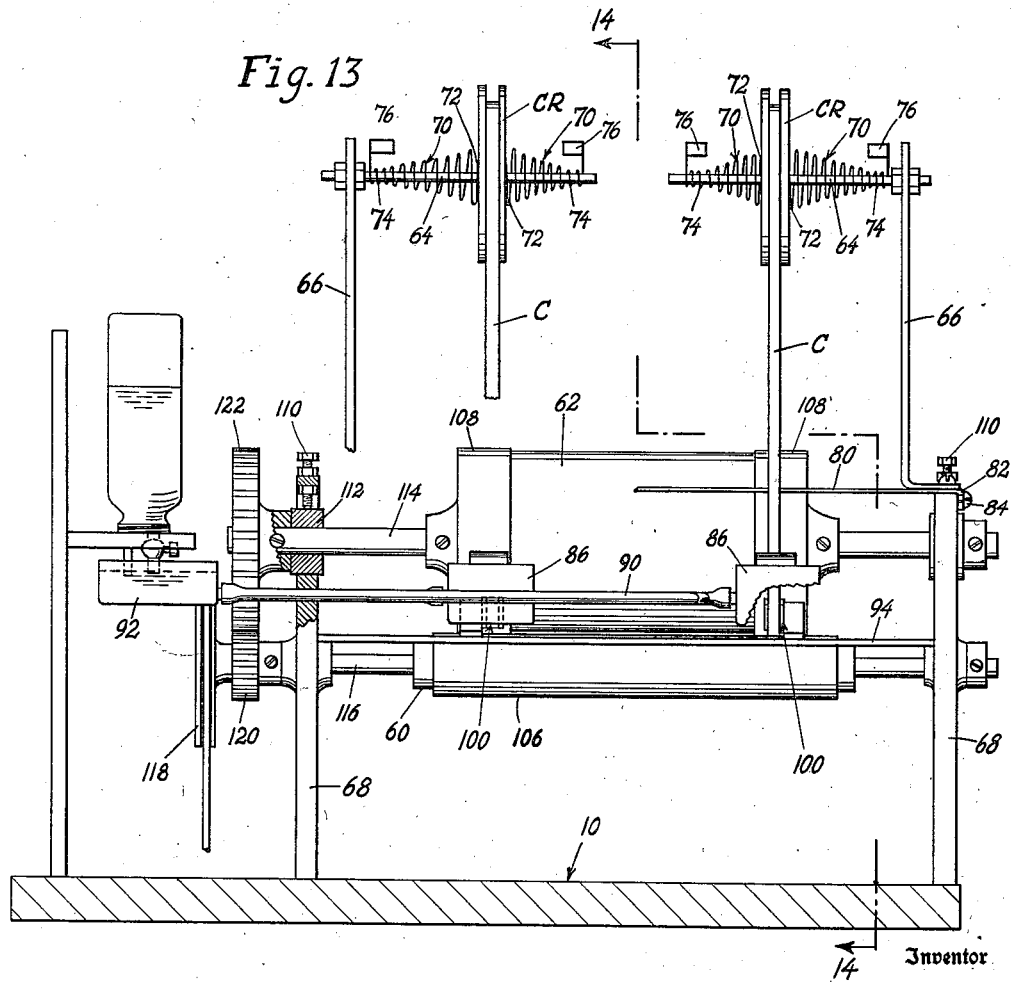
Inventor
HARRY A. FINE
Attorney May 12, 1942. H. A. FINE 2,283,137
METHOD OF AND APPARATUS FOR MAKING ABSORBENT PADS
Filed Oct. 15, 1938 4 Sheets-Sheet 4

Inventor
HARRY A. FINE
By Edwin Levisohn
Attorney

Patented May 12, 1942

2,283,137

UNITED STATES PATENT OFFICE 2,283,137

METHOD OF AND APPARATUS FOR MAKING ABSORBENT PADS

Harry A. Fine, Flushing, N. Y., assignor to I. B. Kleinert Rubber Company, New York, N. Y., a corporation of New York Application October 15, 1938, Serial No. 235,200

12 Claims. (Cl. 154—29)

This invention relates to a method of and apparatus for making absorbent pads. More particularly, the present invention is primarily concerned with the production of absorbent pad material comprising a layer of soft and absorbent cellulosic fibrous material, a covering layer of thin and moisture-permeable paper which, however, is more resistant to disintegration by moisture than the absorbent cellulosic material and which possesses greater tensile strength than the latter, said covering layer overlying one surface of said first mentioned layer and folded over the edges of the same, with the marginal edge portions of said covering layer overlying the other surface of the cellulosic layer and terminating adjacent the side edges of the latter and secured in said position preferably by strips of gummed paper extending longitudinally of the composite material.

One object of the present invention is to provide a method of and apparatus for forming the composite pad material of the character described above, whereby said material may be produced in the form of a continuous length thereof in an economical manner.

Another object of the invention is to provide apparatus for assembling the several layers of the pad material in pad forming relation and for securing the overlapping marginal edge portions of the covering layer to the cellulosic absorbent layer.

A further object of the invention is to provide apparatus in which the several layers of pad-forming material are withdrawn from supply rolls thereof in such relation that the cellulosic material which possesses relatively little tensile strength is reinforced by the covering layer which possesses substantial tensile strength, so that said last mentioned layer as it advances through the apparatus acts as a carrier for the weaker cellulosic layer and thereby prevents disintegration or other impairment thereof during the operation of the apparatus.

A yet further object of the invention is generally to provide apparatus which is simple in construction and which is capable of a high rate of production for manufacturing pad material of the character described.

The above objects of the invention and other objects ancillary thereto will best be understood from the following description considered with reference to the accompanying drawings.

In the drawings:

Fig. 1 is a side view, partly in section, of apparatus embodying the present invention;

Fig. 2 is a perspective view of a length of pad material made in accordance with the present method and by the present apparatus;

Fig. 3 is a sectional view of pad material on the line 3—3 of Fig. 2;

Figure 14:
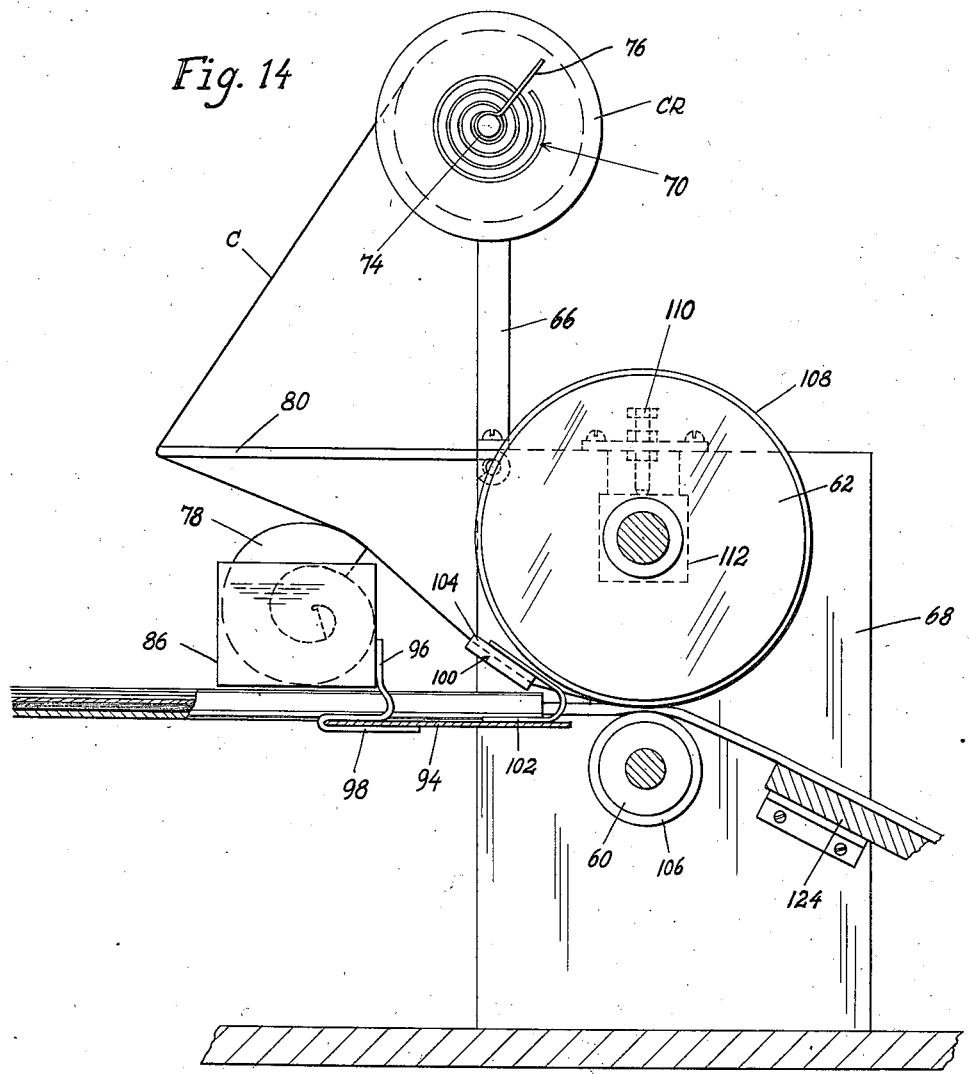

Figs. 4 and 5 are sectional views of the apparatus on the lines 4—4 and 5—5, respectively, of Fig. 1;

Fig. 6 is a top perspective view of part of the apparatus;

Figs. 7 and 8 are sectional views on the lines 7—7 and 8—8, respectively, of Fig. 6;

Fig. 9 is a top plan view of part of the apparatus;

Fig. 10 is a sectional view on the line 10—10 of Fig. 9;

Figs. 11 and 12 are detail sectional views on the lines 11—11 and 12—12, respectively, of Fig. 9;

Fig. 13 is a sectional view on the line 13—13 of Fig. 1;

Fig. 14 is a sectional view on the line 14—14 of Fig. 13;

Referring now to the drawings in detail, and first to Figs. 2 and 3 which illustrate the pad material with which the present method and apparatus are concerned, it will be seen that said pad material comprises a layer A of cellulosic fibrous material which is soft and moisture-absorbent and a cover layer B of thin and soft paper, which while moisture permeable possesses substantial resistance to disintegration by moisture and possesses also a relatively high degree of tensile strength as compared with the tensile strength of fibrous layer A. Layer B completely covers one surface of layer A and is folded over the other surface of said layer, the marginal edge portions B1 of said layer overlapping the marginal side edge portions of absorbent layer A and terminating adjacent said last mentioned marginal edge portions where they are secured by strips of gummed or adhesive-coated paper C. It will be understood that only the inner surfaces C1 of paper strips C are coated with adhesive and that said strips are adhesively united with marginal edge portions B1 of layer B and with the adjacent portions of absorbent layer A continuously along the length of the pad material. Said pad is intended for personal use, as for example in baby pants or diapers, and is arranged normally so that the covering layer B of the pad is disposed next to the skin whereby to prevent the soft and absorbent material of the layer A from adhering to the skin as it is apt to do when moist or wet. It will be understood that in accordance with the present invention, this pad material is formed in continuous lengths and is subsequently cut into suitable pad length.

The method of and apparatus for forming the pad material in accordance with the present invention will now be described. As clearly shown in Fig. 1, the apparatus comprises a suitable support 10 such as the top of a table or bench. The supply of materials for layers A and B are in the form of rolls AR and BR positioned below support 10. The material for layers A and B are wound on spindles 12 and 14 which can freely rotate in their bearings. Layers A and B are directed upwardly over guide rolls 16 and 18, respectively, through an opening 20 in table top 10 and over a roller 22 above said table top. Layer A engages over layer B at roller 22, and from the latter said layers travel as a unit over the supporting plate 24. Said plate is arranged horizontally above table 10 and supported in that position in any suitable way as by posts 26. The upper surface of plate 24 is preferably only slightly above the point at which layers A and B leave roller 22.

As layer A is narrower than layer B, provision is made for centering layer A laterally of layer B. For this purpose layer A is caused to travel under a guide plate 28 which is adjustable laterally of supporting plate 24. Guide 28 is carried by brackets 30 fixed at one end thereof to the sides of said guide and provided at their other ends with U-shaped extensions 32 which slidably engage spaced guide ribs 34 carried by plate 24. It will be observed that guide 28 is positioned slightly above the surface of layer B and that the latter travels under said guide. It will be noted further that, except for the relatively short distance of the length of guide 28, layers A and B are in contact with each other from the point at which they meet at roller 22 to the delivery end of the apparatus. Thus, layer A, which is relatively weak in tensile strength, is reinforced by the stronger layer B for substantially the full length of travel of said layers, from roller 22 to the delivery end of the apparatus. Guide 28 is provided with inturned portions 36 which prevent upward movement of layer A and direct said layer toward layer B as said layer A leaves guide 28.

As layers A and B continue to travel, the marginal edge portions B1 of layer B are folded over the marginal edge portions of layer A. For this purpose there is provided a folder 38. Said folder comprises a bottom plate 40 supported on posts 26 and 42 above table top 10 at the same level as plate 24, it being understood that the top surfaces of plate 24 and the bottom of folder 38 are at the same level and continuous with each other. Folder 38 is provided with folded longitudinally extending inturned portions 44 which merge with the horizontal inturned portions 46 of the folder, whereby marginal edge portions B1 of layer B are positioned over the marginal side edge portions of layer A as said layers travel through the folder. Folder 38 is provided with a cover plate 48 supported in position below folder portions 44 and 46, the arrangement being such that the inner surface of said cover plate 48 only lightly contacts with the top surface of layer A as the latter travels through the folder together with layer B, and it will be noted further that cover plate 48 is so positioned that the folded marginal edge portions B1 of layer B travel between the top surface of plate 48 and the inner surface longitudinal edge portions 44 and 46 of folder 38 at both sides thereof. Cover plate 48 is removably supported in this position by clips 50 secured to said cover plate adjacent one end thereof and removably engageable over projections 52 on inturned portions 46 of the folder. The other end of cover plate 48 is provided with an integral lip 54 which engages releasably over a wire 56 secured at its ends 58 to the side edges of folder 38.

After the marginal edge portions of layer B are folded over the marginal edge portions of layer A, said layers are passed between pressure rollers 60 and 62, and at that point of the apparatus the gummed strips C are associated with said layers and adhesively united thereto for securing folded marginal edge portions B1 of layer B to layer A for maintaining said layers in composite relation. Gummed strips C are wound on reels CR which are mounted for rotation on individual stationary shafts 64 each carried by a rod 66 mounted on one of a pair of standards 68 in which rollers 60 and 62 are journalled for rotation. Provision is made for permitting rotation of reel CR on its shaft 64 and for tensioning strip C supplied from its reel to the layers A and B between the rollers 60 and 62. For this purpose each reel has associated therewith a pair of coiled springs 70, each having an end portion 72 which frictionally engages the reel at opposite sides thereof and end portions 74 which frictionally and resiliently engage shaft 64. It will be noticed that each spring 70 tapers from a wider end 72 which engages the reel to a relatively narrower end at each of said portions 74 which engages the supporting shaft. Said portion 74 of each spring grips the shaft which supports the reel and normally remains in fixed position longitudinally of the shaft for adjusting springs 70 longitudinally of its shaft 64. The narrower end portion 74 of the spring is provided with an extension 76 which facilitates uncoiling of said end portion of the spring to more readily permit adjustment of the spring longitudinally of the shaft. With this mechanism it is a simple matter to adjust the position of each reel CR longitudinally of shaft 64 and in a direction longitudinally of roller 62 of that gummed strip C will engage layers A and B of the pad-forming material at the proper points laterally of said layers for uniting the folded portions of layer B with layer A. Each reel CR is, of course, removable from its shaft.

As gummed strips C are supplied to layers A and B, the adhesive coated surfaces of said strips C are moistened. For this purpose said gummed strips are caused to pass over moistening means, which comprise wicks 78, in engagement therewith. Said strips are directed over said wicks by a guide 80 constituted by a U-shaped wire having its ends 82 secured to the opposite standards 68, respectively, in any suitable way as by screws 84. Wicks 78 are positioned within containers 86 supplied with water fed through tubes 88 and 90 from a uniform level supply container 92. Containers 86 are supported on a plate 94 by means of brackets 96 which are secured to said containers, respectively, and which are provided with bent portions 98 which engage said plate 94 (Fig. 14). As gummed strips C leave wicks 78 they are directed to a point between rollers 60 and 62 by guide members 100, one for each gummed strip. Guide member 100 has a foot portion 102 which is secured to plate 94, and an upwardly and rearwardly inclined U-shaped portion 104 through which the gummed strip travels.

It will be understood that in passing between rollers 60 and 62 together with layers A and B, the moistened surfaces of strips C are pressed against said layers and engage partly over the folded edge portions B1 of layer B and partly over the inwardly adjacent surface portions of layer A, and thereby are secured to both of said layers and in turn secure both of said layers to each other to prevent separation of the folded marginal edge portions of layer B from layer A. To prevent excess moisture which might be applied to gummed strip C from impairing layer A, roller 60 is provided with a surface covering 106 of water-absorbent material such as flannel cloth and for the same purpose roller 62 is provided with covering strips 108 of flannel cloth at the side edge portions of said roller which engage the gummed strips. The pressure of roller 62 on the pad layers can be adjusted by screws 110 which engage the blocks 112 within which the shaft 114 of roller 62 is journalled for rotation, said blocks being slidably mounted in standards 68. Rollers 60 and 62 may be driven in any suitable way. As here shown, the shaft 116 of roller 60 is provided with a belt driven pulley 118, and motion of shaft 116 is transmitted to shaft 114 by gears 120 and 122 fixed to said shafts, respectively. At the delivery end of the apparatus there is provided an inclined support 124 on which the completed pad material travels to a receptacle (not shown.) It will be understood that the pad material thus formed in a continuous length may be cut into pad lengths either by means of a separate machine or by a cutter mechanism operated in timed relation to the feed of the completed pad material from between rollers 60 and 62.

The operation of the apparatus by which the present method is preferably performed is believed to be apparent from the above description. However, briefly summarizing the operation of said apparatus, it will be understood that the layers A and B are associated in superposed relation with layer A uppermost, and that this is accomplished by passing said layers from the supply rolls over roller 22 and over plate 24, with layer B between said plate and guide plate 28 and with layer A over guide plate 23. Thereafter said layers travel as a unit to folder 30 and while thus travelling through said folder the marginal edge portions of layer B are folded over the marginal edge portions of layer A. Then as said layers continue to travel toward the delivery end of the apparatus, strips C are moistened and pressed against said layers A and B between rollers 60 and 62. Rollers 60 and 62, besides serving to cause strips C to unite with said layers, also serve to cause said layers to travel from their supply rolls over the above described means for associating said layers in superposed relation and through the folder. Said layers A and B are suitably tensioned by the friction encountered by said layers in travelling over roller 22, across plates 24 and 28 and through the folder, although if desired tension may be applied to said layers by braking means acting on the supply rollers of said layers. It will be observed that the method of making the pad material is continuous and that said layers are progressively associated with each other in superposed relation and simultaneously treated in the apparatus for folding successive parts of the marginal edge portions of layer B over layer A, and for simultaneously applying successive parts of strip C to the folded-over marginal edge portions of layer B and to the adjacent marginal edge portions of layer A.

Thus it is seen that the method and apparatus herein shown and described are well adapted to accomplish the several objects of the present invention. It will be understood, however, that the invention is susceptible of numerous changes which will occur to those skilled in the art, particularly in view of the present disclosure. Therefore, I do not wish to be limited precisely to the form of the apparatus herein shown or described or to the method herein disclosed, except as may be required by the scope of the appended claims.

Having thus described my invention, what I claim and desire to secure by Letters Patent is:

1. Apparatus for manufacturing absorbent-pad material having a layer of soft absorbent material, a layer of covering material having portions folded over said absorbent layer and strips for securing said folded over portions to said absorbent layer, said apparatus comprising means for associating said layers in superposed relation, a folder, means for causing said superposed layers to travel through said folder, means on said folder, operable during the travel of said layers, to fold marginal edge portions of said layer of covering material over said other layer, means for supplying said strips longitudinally of said folded portions in positions overlapping the same and the absorbent layer adjacent opposite side edges, respectively, of said layers, and means for adhesively uniting said strips with said folded over portions of said covering layer and with the adjacent surface of said other layer.

2. Apparatus for manufacturing absorbent-pad material having a layer of soft absorbent material, a layer of covering material having portions folded over said absorbent layer and strips for securing said folded over portions to said absorbent layer, said apparatus comprising means for associating said layers in superposed relation, a folder, means for causing said superposed layers to travel through said folder, means on said folder, operable during the travel of said layers, to fold marginal edge portions of said layer of covering material over said other layer, means for supplying said strips longitudinally of said folded portions in positions overlapping the same and the absorbent layer adjacent opposite side edges, respectively, of said layers, said strip supplying means comprising a pair of reels carrying said strips, respectively, and means for supporting said reels in positions adjustable transversely of said layers, and means for adhesively uniting said strips with said folded over portions of said covering layer and with the adjacent surface of said other layer, said last mentioned means comprising rollers between which said layers and strips pass and which also causes said layers to travel through said folder.

3. Apparatus for manufacturing absorbent-pad material having a layer of soft absorbent material, a layer of covering material having portions folded over said absorbent layer and adhesive-coated strips for securing said folded over portions to said absorbent layer, said apparatus comprising means for associating said layers in superposed relation, a folder, means for causing said superposed layers to travel through said folder, means on said folder, operable during the travel of said layers, to fold marginal edge portions of said layer of covering material over said other layer, means for supplying said strips longitudinally of said folded portions in positions overlapping the same and the absorbent layer adjacent opposite side edges, respectively, of said layers, said strip supplying means comprising a pair of reels carrying said strips, respectively, and means for supporting said reels in positions adjustable transversely of said layers, means for moistening the adhesive on said strips during the travel of the latter from said reels to said layers, and means for thereafter pressing said strips into engagement with said folded over portions of said covering layer and with said other layer for adhesively uniting said strips therewith.

4. Apparatus for manufacturing absorbent-pad material having a layer of soft absorbent material, a layer of covering material having portions folded over said absorbent layer and adhesive-coated strips for securing said folded over portions to said absorbent layer, said apparatus comprising means for associating said layers in superposed relation, a folder, means for causing said superposed layers to travel through said folder, means on said folder, operable during the travel of said layers, to fold marginal edge portions of said layer of covering material over said other layer, means for supplying said strips longitudinally of said folded portions in positions overlapping the same and the absorbent layer adjacent opposite side edges, respectively, of said layers, said strip supplying means comprising a pair of reels carrying said strips, respectively, and means for supporting said reels in positions adjustable transversely of said layers, means for moistening the adhesive on said strips during the travel of the latter from said reels to said layers, and means for thereafter pressing said strips into engagement with said folded over portions of said covering layer and with said other layer for adhesively uniting said strips therewith, said last mentioned means comprising rollers between which said layers and strips pass and which also causes said layers to travel through said folder.

5. Apparatus for manufacturing absorbent-pad material having a layer of soft absorbent material and a layer of covering material having portions folded over said absorbent layer, said apparatus comprising means for associating said layers in superposed relation, said means including a horizontal supporting plate and an adjusting plate spaced above said horizontal plate providing a space between said plates for the passage of said covering layer, said adjusting plate supporting said absorbent layer and being movable laterally of said supporting plate for adjusting the absorbent layer laterally of said covering layer, a folder positioned in advance of said adjusting plate, means for causing said superposed layers to travel through said folder, and means on said folder, operable during the travel of said layers, to fold marginal edge portions of said layer of covering material over said other layer.

6. Apparatus for manufacturing absorbent-pad material having a layer of soft absorbent material, a layer of covering material having portions folded over said absorbent layer and adhesive-coated strips for securing said folded over portions to said absorbent layer, said apparatus comprising means for associating said layers in superposed relation, said means including a horizontal supporting plate and an adjusting plate spaced above said horizontal plate providing a space between said plates for the passage of said covering layer, said adjusting plate supporting said absorbent layer and being movable laterally of said supporting plate for adjusting the absorbent layer laterally of said covering layer, a folder positioned in advance of said adjusting plate, means for causing said superposed layers to travel through said folder, means on said folder, operable during the travel of said layers, to fold marginal edge portions of said layer of covering material over marginal edge portions of said other layer, means for moistening the adhesive on said strips, means for supplying said strips to said layers during the travel thereof in positions and adjacent the side edges of said layers overlapping the folded portions of said covering layer and adjacent portions of said absorbent layer, respectively, and means for thereafter pressing said strips into engagement with said folded over portions of said covering layer and with said other layer for adhesively uniting said strips therewith.

7. Apparatus for manufacturing absorbent-pad material having a layer of soft absorbent material, a layer of covering material having portions folded over said absorbent layer and adhesive-coated strips for securing said folded over portions to said absorbent layer, said apparatus comprising means for associating said layers in superposed relation, said means including a horizontal supporting plate and an adjusting plate spaced above said horizontal plate providing a space between said plates for the passage therebetween of said covering layer, said adjusting plate supporting said absorbent layer and being movable laterally of said supporting plate for adjusting the absorbent layer laterally of said covering layer, a folder positioned in advance of said adjusting plate, means for causing said superposed layers to travel through said folder, means on said folder, operable during the travel of said layers, to fold marginal edge portions of said layer of covering material over marginal edge portions of said other layer, means for supplying said strips to said layers during the travel thereof in positions and adjacent the side edges of said layers overlapping the folded portions of said covering layer and adjacent portions of said absorbent layer, respectively, means for moistening the adhesive on said strips, and means for thereafter pressing said strips into engagement with said folded over portions of said covering layer and with said other layer for adhesively uniting said strips therewith, said last mentioned means comprising rollers between which said layers and strips pass and which also causes said layers to travel through said folder.

8. Apparatus for manufacturing absorbent-pad material having a layer of soft absorbent material, a layer of covering material having portions folded over said absorbent layer and strips for securing said folded over portions to said absorbent layer, said apparatus comprising means for associating said layers in superposed relation with said absorbent layer uppermost, a folder, means for causing said superposed layers to travel through said folder, means on said folder, operable during the travel of said layers, to fold marginal edge portions of said layer of covering material over marginal edge portions of said other layer, means for supplying said strips to said layers during the travel thereof in positions and adjacent the side edges of said layers overlapping the folded portions of said covering layer and adjacent portions of said absorbent layer, respectively, and means for adhesively uniting said strips progressively with said folded over portions of said covering layer and with the adjacent surface portions of said other layer during the travel of said layers.

9. The method of manufacturing lengths of absorbent-pad material having a layer of soft absorbent material, a covering layer having portions folded over said absorbent material and strips extending longitudinally of said pad material for securing said folded over portions to said absorbent layer, which method comprises continuously advancing said layers and associating said layers in superposed relation during the travel thereof, folding marginal edge portions of said covering layer over marginal edge portions of said absorbent layer while said layers travel as a unit, and simultaneously feeding said strips to positions adjacent opposite side edges, respectively, of said layers and adhesively uniting said strips progressively with said absorbent layer and with said folded over portions of said covering layer in said positions adjacent opposite sides, respectively, of said layers.

10. The method of manufacturing lengths of absorbent-pad material having a layer of soft absorbent material, a covering layer having portions folded over said absorbent material and adhesive-coated strips extending longitudinally of said pad material for securing said folded over portions to said absorbent layer, which method comprises continuously advancing said layers and associating said layers in superposed relation during the travel thereof, folding marginal edge portions of said covering layer over marginal edge portions of said absorbent layer while said layers travel as a unit, feeding said strips to positions adjacent opposite side edges, respectively, of said layers and simultaneously moistening said adhesive-coated strips, and pressing said moistened strips against said absorbent layer and the folded over marginal edge portions of said covering layer to unite said strips therewith progressively during the travel of said layers for securing said portions of the covering layer in said folded over position.

11. The method of manufacturing lengths of absorbent-pad material having a layer of soft absorbent material, a covering layer having portions folded over said absorbent material and strips extending longitudinally of said pad material for securing said folded over portions to said absorbent layer, which method comprises continuously advancing said layers and associating said layers in superposed relation, folding marginal edge portions of said covering layer over marginal edge portions of said absorbent layer while said layers travel as a unit, and simultaneously feeding said strips to positions adjacent opposite side edges, respectively, of said layers and adhesively uniting said strips progressively with said absorbent layer and with said folded over portions of said covering layer in said positions adjacent opposite sides, respectively, of said layers and then cutting said pad material into pad lengths.

12. The method of manufacturing lengths of absorbent-pad material having a layer of soft absorbent material, a covering layer having portions folded over said absorbent material and adhesive-coated strips extending longitudinally of said pad material for securing said folded over portions to said absorbent layer, which method comprises continuously advancing said layers and associating said layers in superposed relation, folding marginal edge portions of said covering layer over marginal edge portions of said absorbent layer while said layers travel as a unit, simultaneously feeding said strips to positions adjacent opposite side edges, respectively, of said layers and moistening said adhesive-coated strips during the travel thereof, and pressing said moistened strips against said absorbent layer and the folded over marginal edge portions of said covering layer to unite said strips therewith for securing said portions of the covering layer in said folded over position, and then cutting said pad material into pad lengths.

HARRY A. FINE.